(12) United States Patent
Yokota

(10) Patent No.: US 11,845,494 B2
(45) Date of Patent: Dec. 19, 2023

(54) VEHICLE BODY STRUCTURE

(71) Applicants: SUBARU CORPORATION, Tokyo (JP); TOYOTA JIDOSHA KABUSHIKI KAISHA, Toyota (JP)

(72) Inventor: Keisuke Yokota, Tokyo (JP)

(73) Assignees: SUBARU CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/702,421

(22) Filed: Mar. 23, 2022

(65) Prior Publication Data

US 2022/0348264 A1    Nov. 3, 2022

(30) Foreign Application Priority Data

Apr. 30, 2021 (JP) .................................. 2021-077141

(51) Int. Cl.
*B62D 25/06* (2006.01)
*B62D 27/02* (2006.01)

(52) U.S. Cl.
CPC .......... *B62D 25/06* (2013.01); *B62D 27/023* (2013.01)

(58) Field of Classification Search
CPC .............................. B62D 25/06; B62D 27/023

USPC ......................... 296/23.01–23.3, 210, 29, 30
See application file for complete search history.

(56) References Cited

U.S. PATENT DOCUMENTS 3,427,068 A * 2/1969 Keahn ...................... B60J 7/106
296/210

FOREIGN PATENT DOCUMENTS

DE  102016001316 A1 * 8/2016 ............. B62D 25/00
JP  2016-150700 A    8/2016

* cited by examiner

*Primary Examiner* — Dennis H Pedder
(74) *Attorney, Agent, or Firm* — MCGINN I.P. LAW GROUP, PLLC

(57) ABSTRACT

A vehicle body structure includes: a roof panel, a rail disposed below the roof panel and extending in a left-right direction, a brace disposed below the roof panel and coupled to an end of the rail and extending from the rail toward in a front-rear direction, a reinforcing member reinforcing a connection portion where the rail is coupled to the brace. A first end of a main wall of the reinforcing member is welded to a first-end-side flange of the rail. A second end of the main wall is welded to a second-end-side flange of the rail and to an end of the brace on the first side in the front-rear direction. The reinforcing member includes flanges welded to the bottom wall of the rail.

10 Claims, 5 Drawing Sheets

VEHICLE BODY STRUCTURE

CROSS-REFERENCE TO RELATED APPLICATIONS

The present application claims priority from Japanese Patent Application No. 2021-077141 filed on Apr. 30, 2021, the entire contents of which are hereby incorporated by reference.

The present disclosure relates to a vehicle body structure in which a rail extending in a left-right direction and a brace extending in a front-rear direction are disposed below a roof panel.

As a vehicle body structure, there has been an upper body structure in which a front header extending in a vehicle width direction is bridged between upper ends of left and right front pillars, and a front end of a front-rear roof reinforcement is coupled to a substantially central position of the front header in the vehicle width direction as disclosed, for example, in Japanese Unexamined Patent Application Publication (JP-A) No. 2016-150700. In the vehicle body structure described in JP-A No. 2016-150700, a link member is provided on an inner side of the front header at the same position as the front-rear roof reinforcement in the vehicle width direction.

SUMMARY

An aspect of the disclosure provides a vehicle body structure. The vehicle body structure includes a roof panel, a rail, a brace, and a reinforcing member. The rail is disposed below the roof panel and extending in a left-right direction of a vehicle. The rail includes a bottom wall, a first-end wall, a first-end-side flange, a second-end wall, and a second-end-side flange. The bottom wall extends substantially in a front-rear direction in a side cross section of the vehicle. The first-end wall extends substantially upward from an end of the bottom wall on a first side in the front-rear direction. The first-end-side flange extends from an upper end of the first-end wall toward the first side in the front-rear direction. The second-end wall extends substantially upward from an end of the bottom wall on a second side in the front-rear direction. The second-end-side flange extends from an upper end of the second-end wall toward the second side in the front-rear direction. The brace is disposed below the roof panel, coupled to an end on the second side in the front-rear direction of the rail, and extending from the rail toward the second side in the front-rear direction. The reinforcing member is configured to reinforce a connection portion of the rail, the connection portion being coupled to the brace. The reinforcing member includes a main wall, side walls in pairs, and a pair of side flanges in pairs. The main wall extends substantially in the left-right direction in a front cross section. The side walls extend substantially downward from respective ends in the left-right direction of the main wall. Each of the pair of side flanges extends substantially outward in the left-right direction from a lower end of a corresponding one of the side walls. The main wall has a first end on the first side in the front-rear direction welded to the first-end-side flange of the rail, and a second end on the second side in the front-rear direction welded to the second-end-side flange of the rail and to an end of the brace on the first side in the front-rear direction. The flanges of the reinforcing member are welded to the bottom wall of the rail. The roof panel is bonded to the main wall of the reinforcing member.

BRIEF DESCRIPTION OF DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

In the vehicle body structure described in JP-A No. 2016-150700, since the link member serving as a reinforcing member and the front-rear roof reinforcement serving as a brace are provided separately and independently, the rigidity improvement of the rail is limited.

It is desirable to provide a vehicle body structure capable of further improving rigidity of a rail.

In the following, an embodiment of the disclosure is described in detail with reference to the accompanying drawings. Note that the following description is directed to illustrative an example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
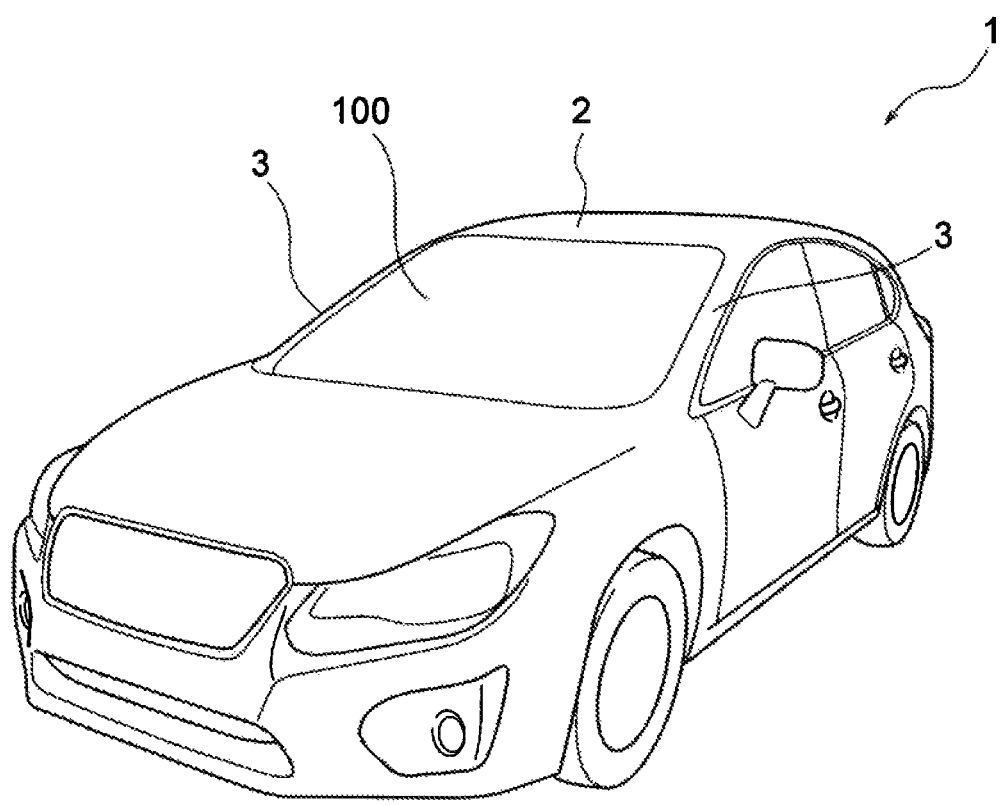
FIG. 1 is an external perspective view of a vehicle indicating an embodiment of the present disclosure.
Figure 2:
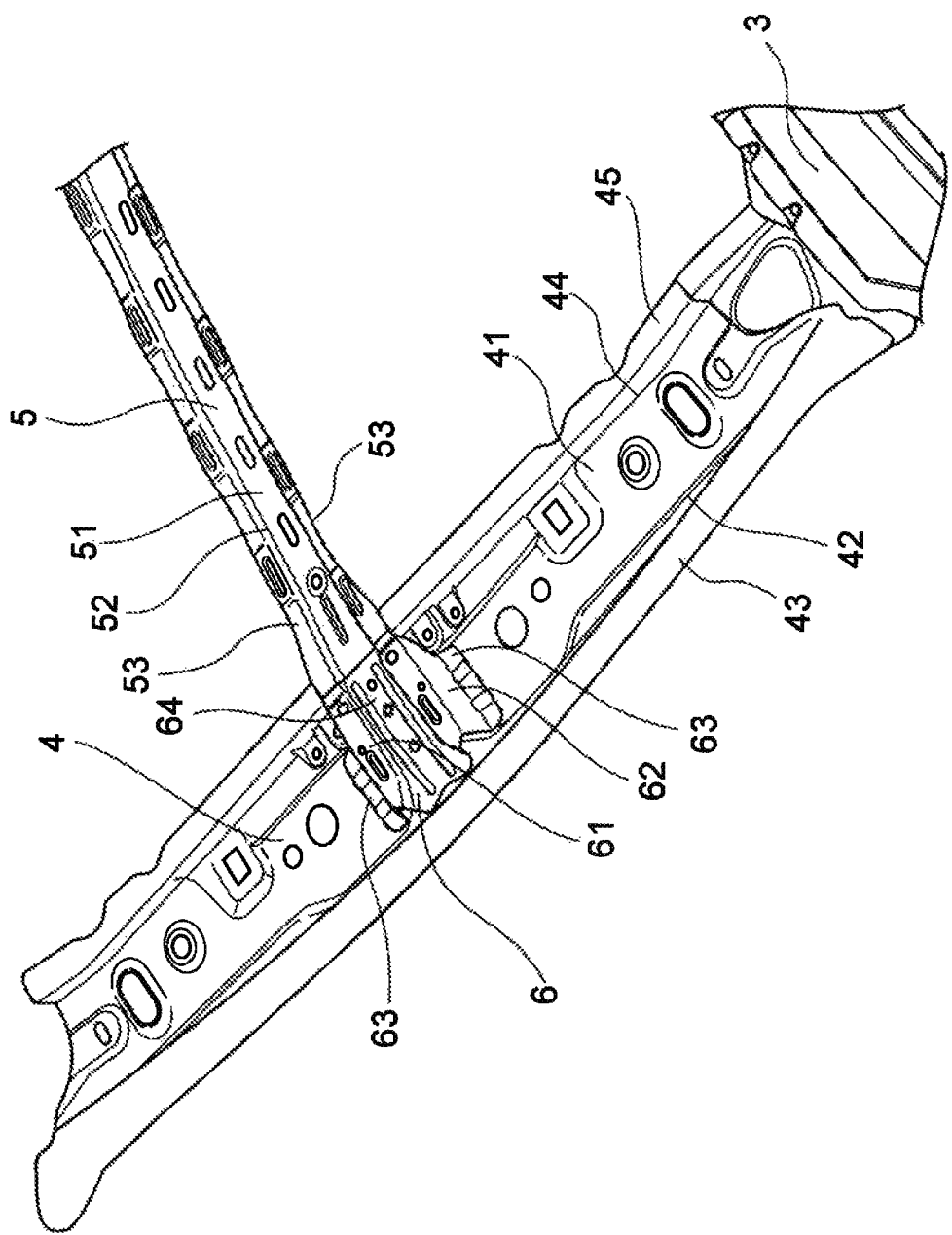
FIG. 2 is a schematic perspective view indicating a state in which a roof panel and an interjacent plate of a vehicle body upper structure are removed.
Figure 3:
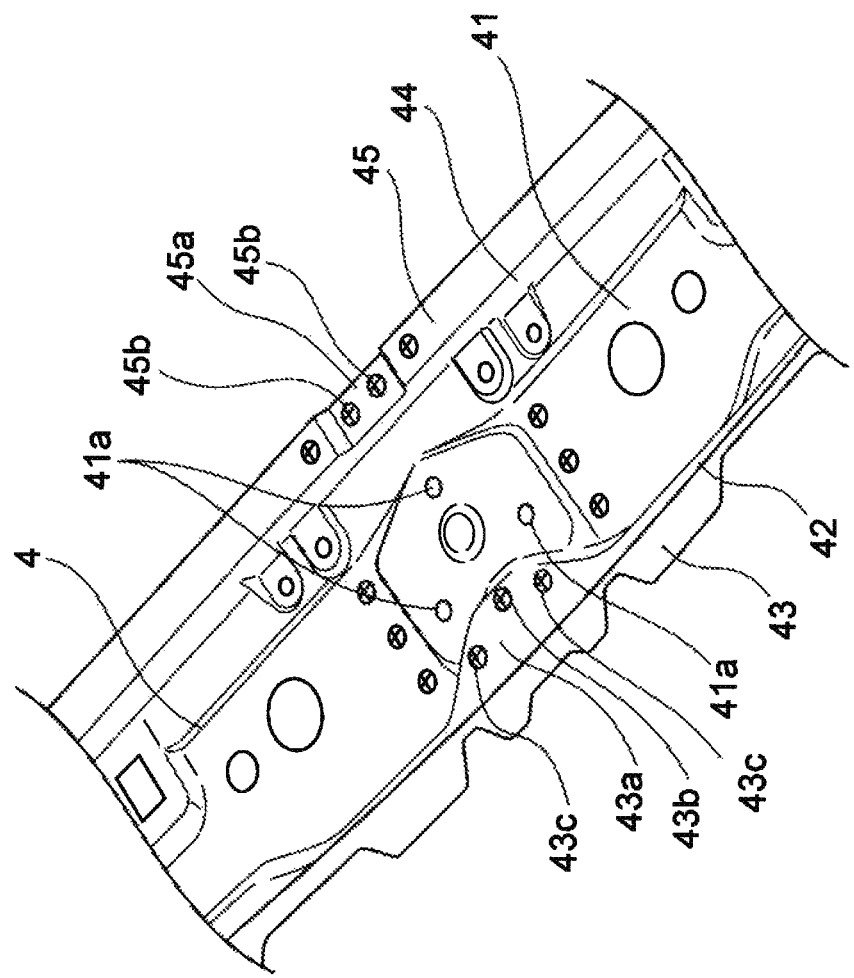
FIG. 3 is a partial schematic perspective view of a rail front.
Figure 4:
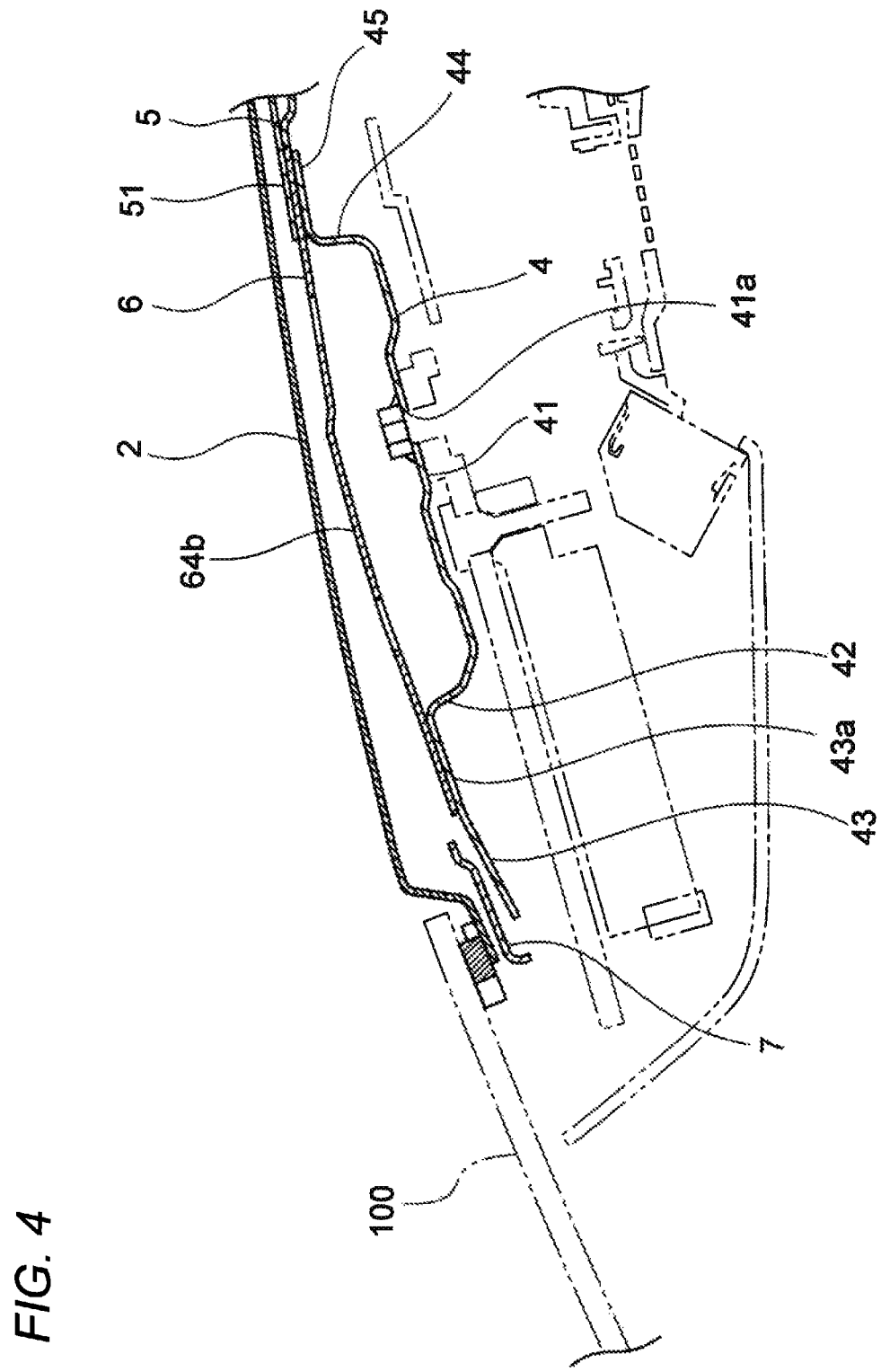
FIG. 4 is a schematic side cross-sectional view of the vehicle body upper structure.
Figure 5:
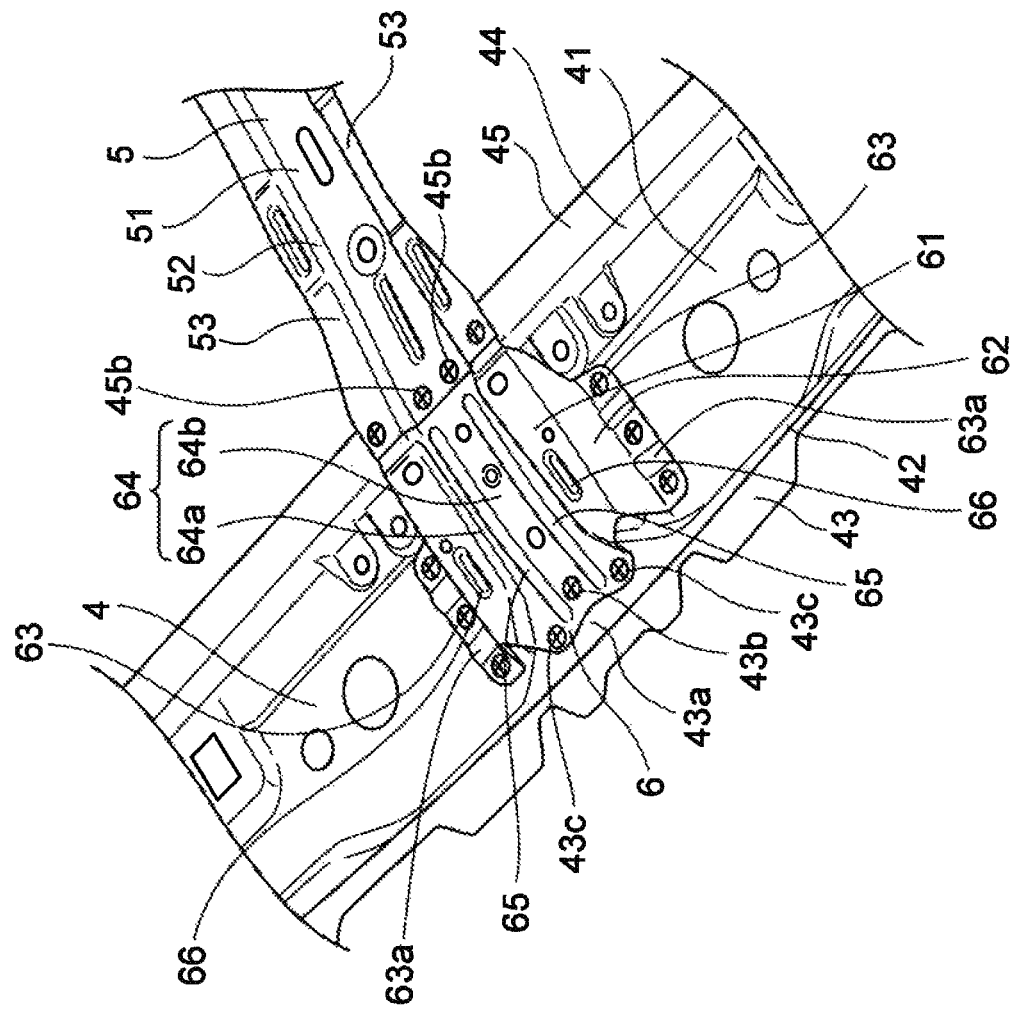
FIG. 5 is a partial schematic perspective view of the rail front indicating a state in which a reinforcing member and a brace are joined to each other.

FIGS. 1 to 5 indicate an embodiment of the present disclosure, in which FIG. 1 is an external perspective view of a vehicle indicating the embodiment, FIG. 2 is a schematic perspective view indicating a state in which a roof panel and an interjacent plate of a vehicle body upper structure are removed, FIG. 3 is a partial schematic perspective view of a rail front, FIG. 4 is a schematic side cross-sectional view of the vehicle body upper structure, and FIG. 5 is a partial schematic perspective view of the rail front indicating a state in which a reinforcing member and a brace are joined.

As indicated in FIG. 1, the vehicle 1 includes a roof panel 2 that partitions an upper portion of an interior space. A roof panel 2 forms an outer plate of the vehicle 1, and has a front end side covered with a rear end side of a windshield glass 100 from above. In the embodiment, the roof panel 2 is made of aluminum.

As indicated in FIG. 2, the vehicle body structure of the vehicle 1 includes: a rail front 4 disposed below the roof panel 2, connecting upper ends of a pair of left and right front pillars 3, and extending in a left-right direction; a brace 5 disposed below the roof panel 2, coupled to a left-right center of the rail front 4, and extending in a front-rear direction; and a reinforcing member 6 that reinforces a connection portion of the rail front 4 that is coupled with the brace 5. In the embodiment, the front pillars 3, the rail front 4, the brace 5, and the reinforcing member 6 are each made of steel.

As indicated in FIG. 3, the rail front 4 includes, in a side cross section, a bottom wall 41 extending substantially forward and rearward, a front wall 42 extending substantially upward from a front end of the bottom wall 41, a front flange 43 extending substantially forward from an upper end of the front wall 42, a rear wall 44 extending substantially upward from a rear end of the bottom wall 41, and a rear flange 45 extending substantially rearward from an upper end of the rear wall 44. As indicated in FIG. 4, the embodiment is provided with an interjacent plate 7 made of aluminum and provided between the roof panel 2 and the rail front 4. The interjacent plate 7 is joined to the flange of the roof panel 2 by welding, and is joined to the front flange 43 of the rail front 4 by swaging joint.

As indicated in FIG. 2, the brace 5 includes a main wall 51, a pair of vertical walls 52, and a pair of side flanges 53. The main wall 51, in a front cross section, extends substantially in the left-right direction. The pair of vertical walls 52 extend substantially upward from both ends in the left-right direction of the main wall 51. The pair of side flanges 53 extending substantially outward in the left-right direction from upper ends of the respective vertical walls 52. The brace 5 has a front end coupled to the rear flange 45 of the rail front 4. As indicated in FIG. 3, the rear flange 45 of the rail front 4 has a recess 45a having the same shape as the main wall 51 and the vertical walls 52 of the brace 5 in a front view. The rail front 4 and the brace 5 are joined to each other by overlapping and welding the front end of the brace 5 to the recess 45a. In FIG. 3, joining positions of the brace 5 and the reinforcing member 6 on the rail front 4 are indicated by a cross in a circle. In the embodiment, the reinforcing member 6 is interjacent at a joining portion between the rail front 4 and the brace 5, and is joined together with the rail front 4 and the brace 5 by spot welding.

As indicated in FIG. 5, the reinforcing member 6 includes a main wall 61, a pair of side walls 62, and a pair of side flanges 63. The main wall 61, in a front cross section, extends substantially in the left-right direction. The pair of side walls 62 extend substantially downward from both ends in the left-right direction of the main wall 61. The pair of side flanges 63 extend substantially outward in the left-right direction from lower ends of the respective side walls 62. The main wall 61 has a recess 64 including a pair of vertical wall portions 64a extending in the front-rear direction and a bottom portion 64b connecting the vertical wall portions 64a. The recess 64 has a rear end side formed in the same shape as the recess 45a of the rear flange 45 in a front view. As described above, the main wall 61 has a rear end side welded to the rear flange 45 of the rail front 4 and the front end side of the brace 5, and has a front end side welded to the front flange 43 of the rail front 4. In FIG. 5, joining positions of the reinforcing member 6, the rail front 4, and the brace 5 are indicated by a cross in a circle. Each flange 63 is welded to the bottom wall 41 of the rail front 4. In the embodiment, each flange 63 is formed with a plurality of beads 63a protruding upward and extending in the left-right direction. A portion of each flange 63 without being formed with the beads 63a is welded to the bottom wall 41. As indicated in FIG. 3, the bottom wall 41 of the rail front 4 includes an in-vehicle device attachment portion 41a below the main wall 61 of the reinforcing member 6. FIG. 3 indicates a hole formed in the bottom wall 41 as the in-vehicle device attachment portion 41a, which is welded to a weld nut that can be inserted with an attachment screw of an in-vehicle device, so as to be used for attachment of the in-vehicle device.

As illustrated in FIG. 3, the front flange 43 of the rail front 4 has a protrusion 43a that protrudes rearward in a plan view and that is welded to the main wall 61 of the reinforcing member 6. The protrusion 43a has a substantially triangular shape in a plan view, and is formed thinner toward the rear side. As illustrated in FIG. 5, the protrusion 43a of the rail front 4 and the main wall 61 of the reinforcing member 6 are joined to each other by spot welding. In the embodiment, the bottom portion 64b of the recess 64 of the main wall 61 is joined to the protrusion 43a. In the embodiment, the protrusion 43a of the rail front 4 and the main wall 61 of the reinforcing member 6 are joined to each other at one point on a distal end side of the protrusion 43a and at two points on a proximal end side of the protrusion 43a. As indicated in FIG. 5, a joining position 43b on the distal end side is disposed rearward of joining positions 43c on the proximal end side. The joining positions 43c on the proximal end side are disposed on left and right outer sides of the joining position 43b on the distal end side, respectively. As indicated in FIG. 4, the joining positions 43b and 43c of the front flange 43 to the bottom portion 64b of the recess 64 of the main wall 61 and the joining positions 45b of the rear flange 45 to the bottom portion 64b of the recess 64 of the main wall 61 have substantially the same height from the bottom wall 41 of the rail front 4. In the embodiment, the rear end side of the main wall 61 is joined to the rear flange 45 also at outer sides of the recess 64 in the vehicle width direction.

As indicated in FIG. 5, the main wall 61 of the reinforcing member 6 includes beads 65 thereon that extend in the front-rear direction and that are formed without overlapping with the joining positions 43b and 43c of the protrusion 43a. The beads 65 are formed on the bottom portion 64b of the recess 64 of the main wall 61 in a manner protruding upward. In the embodiment, the beads 65 are disposed in a left and right pair in a manner separated on left and right sides from the joining position 43b on the distal end side of the protrusion 43a. More specifically, the beads 65 are disposed between the joining position 43b on the distal end side and the respective joining positions 43c on the proximal end side in the left-right direction. In the embodiment, the beads 65 each have a front end located forward of the joining position 43b on the distal end side. More specifically, the front ends of the beads 65 are disposed between the joining position 43b on the distal end side and the respective joining positions 43c on the proximal end side in the front-rear direction. On the other hand, the beads 65 each have a rear end located just forward of the joining position 45b of the main wall 61 with the rear flange 45.

The respective vertical wall portions 64a of the recess 64 in the main wall 61 of the reinforcing member 6 have rear end sides formed continuously with the respective vertical walls 52 of the brace 5, and extend to substantially the same position as the front ends of the bead 65 in the front-rear direction. That is, the vertical wall portions 64a of the reinforcing member 6 each have a front end located forward of the rear ends of the beads 65. Further, the left and right outer sides of the recess 64 in the main wall 61 of the reinforcing member 6 are formed with connecting portions 66 that are coupled to the roof panel 2.

According to the vehicle body structure configured as described above, the main wall 61 of the reinforcing member 6 is coupled to the front end of the brace 5, and connects the front flange 43 and the rear flange 45 of the rail front 4. Accordingly, a load from the brace 5 is mainly received by the reinforcing member 6. Further, the flanges 43 and 45, the front wall 42, and the rear wall 44 of the rail front 4 can be restricted from movement and inclination in the front-rear direction, and the side surface cross section of the rail front 4 can be prevented from deformation. Further, the flanges 63 of the reinforcing member 6 are joined to the bottom wall 41 of the rail front 4 to form a closed cross section in a front view by the reinforcing member 6 and the rail front 4, and the roof panel 2 is coupled to the main wall 61 of the reinforcing member 6. Thereby, the side cross section including the bottom wall 41 of the rail front 4 can be prevented from deformation. Furthermore, the beads 65 of the reinforcing member 6 also prevent the side cross section of the rail front 4 from deformation. Therefore, when the vehicle-mounted device is attached to the vehicle-mounted device attachment portion 41a of the rail front 4 and the roof panel 2 and the rail front 4 are applied with a force in the vertical direction, the side cross section of the rail front 4 can be prevented from deformation, and the vehicle-mounted device can be held accurately.

In addition, the front ends of the beads 65 are located forward of the joining position 43b on the distal end side in the protrusion 43a of the front flange 43 of the rail front 4, and thus can limit deformation of the reinforcing member 6 in the vicinity of the joining position 43b on the distal end side, which is more likely to deform. Further, by shifting the joining position 43b on the distal end side, which is located on a center side in the left-right direction among the three joining positions 43b and 43c, forward of the joining positions 43c on the proximal end side which are located at two outermost positions, it is possible to prevent deformation in the vicinity of the joining positions 43b and 43c, which are more likely to deform in the reinforcing member 6.

Further, the joining positions 43b, 43c, 45b of the main wall 61 of the reinforcing member 6 to the rail front 4 have substantially the same height from the bottom wall on front and rear end sides. Thereby, the main wall 61 of the reinforcing member 6 is substantially parallel to the bottom wall 41 of the rail front 4, and a cross-sectional shape formed by the reinforcing member 6 and the rail front 4 can have higher rigidity as compared to a case where the main wall 61 of the reinforcing member 6 is not parallel to the bottom wall 41 of the rail front 4. In the embodiment, as indicated in FIG. 4, the bottom portion 64b of the recess 64 in the main wall 61 is substantially parallel to the bottom wall 41 of the rail front 4.

Further, the vertical walls 52 of the brace 5 are formed continuously with the vertical wall portions 64a of the reinforcing member 6 so as to straddle the rear end of the rail front 4. Thereby, the load from the brace 5 is hardly transmitted to the rear end of the rail front 4, which can effectively prevent deformation of the side cross section of the rail front 4. Further, the front ends of the vertical wall portions 64a of the reinforcing member 6 are located forward of the rear ends of the beads 65. Thereby, the rigidity of the reinforcing member 6 can be ensured in the entire front-rear direction.

In the above embodiment, the present disclosure is applied to the rail front 4 coupling the upper ends of the front pillars 3, but the present disclosure can also be applied to, for example, a rail rear coupling upper ends of rear pillars, and can be applied to any place where one end in the front-rear direction of a brace is coupled to a rail extending in the left-right direction in the vehicle body upper portion. Thus, it is noted that the configuration of the invention can be easily changed as would be known by one of skill in the art taking the present application as a whole, and while "first" and "second" terminology has been used throughout the present application to refer exemplarily to "front" and "rear" directions, respectively, with respect to walls, flanges, and sides, an opposite (or other) convention could be used such that, for example, "first" and "second" terminology refers to "rear" and "front" directions, respectively. In addition, the bottom wall 41 of the rail front 4 is formed with the vehicle-mounted device attachment portion 41a, but the rail front 4 may have no vehicle-mounted devices attached thereto.

In the above-described embodiment, the protrusion 43a of the front flange 43 of the rail front 4 is jointed to the main wall 61 of the reinforcing member 6 at three locations, but may also be joined at two or less locations, or four or more locations. When joined at four or more positions, in some embodiments, at least one joining position located on the center side in the left-right direction is disposed rearward of two joining positions respectively located on outermost sides.

In the above-described embodiment, the joining positions 43b and 43c of the main wall 61 and the front flange 43 and the joining positions 45b of the main wall 61 and the rear flange 45 have substantially the same height from the bottom wall 41, which, however, is not necessarily the same as long as the commonly used rigidity can be ensured. The protrusion 43a of the front flange 43 of the rail front 4 and the beads 65 of the reinforcing member 61 may be omitted as appropriate as long as the commonly used rigidity can be ensured.

Further, in the above-described embodiment, the vertical wall portions 64a of the main wall 61 of the reinforcing member 6 are formed continuously with the respective vertical walls 52 of the brace 5, but the vertical wall portions 64a continuous with the respective vertical walls 52 may be omitted when commonly used rigidity is secured by joining the rear end side of the main wall 61 of the reinforcing member 6 to the rear flange 45 of the rail front 4 and the brace 5 and joining the front end side to the front flange 43 of the rail front 4.

Although the embodiment of the present disclosure has been described above, the disclosures described in the claims are not limited to the embodiment described above. It should be noted that all combinations of the features described in the embodiment are not necessarily essential to the solution to problems of the disclosure.

According to the vehicle body structure of the embodiment, the main wall of the reinforcing member is coupled to the end on the first side in the front-rear direction of the brace, and connects the first-end-side flange and the second-end-side flange of the rail. Accordingly, a load from the brace is mainly received by the reinforcing member. Further, the flanges of the rail can be restricted from movement in the front-rear direction, and the side surface cross section of the rail can be prevented from deformation. Further, the flanges of the reinforcing member are joined to the bottom wall of the rail to form a closed cross section in a front view by the reinforcing member and the rail, and the roof panel is coupled to the main wall of the reinforcing member. Thereby, the rigidity in the vicinity of the connection portion of the rail with the brace can be improved.

According to the vehicle body structure of the embodiment, the beads of the reinforcing member can further improve the rigidity in the vicinity of the connection portion of the rail with the brace, and can further prevent deformation of the bottom wall of the rail formed with the in-vehicle device attachment portion. As a result, the weight of the in-vehicle device to be attached to the rail can be increased. In addition, the ends on the first side in the front-rear direction of the beads are located on the first side in the front-rear direction of the joining position of the protrusion of the first-end-side flange of the rail, and thus can limit deformation of the reinforcing member in the vicinity of the joining position, which is more likely to deform.

According to the vehicle body structure of the embodiment, among the plurality of joining locations of the protrusion of the first-end-side flange of the rail and the main wall of the reinforcing member, the joining position on the center side in the left-right direction is shifted toward the second side in the front-rear direction. Thereby, it is possible to prevent deformation in the vicinity of the joining positions, which are more likely to deform in the reinforcing member.

According to the vehicle body structure of the embodiment, the vertical walls of the brace are formed continuously with the vertical wall portions of the reinforcing member so as to straddle the end on the second side in the front-rear direction of the rail. Thereby, the load from the brace is hardly transmitted to the end on the second side of the rail, which can further prevent deformation of the side cross section of the rail. Further, the ends on the first side in the front-rear direction of the vertical wall portions of the reinforcing member are located on the first side in the front-rear direction of the ends on the second side in the front-rear direction of the beads. Thereby, the rigidity of the reinforcing member can be ensured in the entire front-rear direction.

According to the vehicle body structure of the embodiment, the joining positions of the main wall of the reinforcing member to the rail have substantially the same height from the bottom wall on front and rear end sides. Thereby, the main wall of the reinforcing member is substantially parallel to the bottom wall of the rail, and a cross-sectional shape formed by the reinforcing member and the rail can have higher rigidity as compared to a case where the main wall of the reinforcing member is not parallel to the bottom wall of the rail.

According to the vehicle body structure of the embodiment, rigidity of a rail can be further improved.

What is claimed is:
1. A vehicle body structure comprising:
a roof panel;
a rail;
a brace; and
a reinforcing member,
wherein the rail is disposed below the roof panel and extending in a left-right direction of a vehicle,
wherein the rail comprises a bottom wall, a first-end wall, a first-end-side flange, a second-end wall, and a second-end-side flange,
wherein the bottom wall extends substantially in a front-rear direction of the vehicle in a side cross section,
wherein the first-end wall extends substantially upward from an end of the bottom wall on a first side in the front-rear direction,
wherein the first-end-side flange extends from an upper end of the first-end wall toward the first side in the front-rear direction,
wherein the second-end wall extends substantially upward from an end of the bottom wall on a second side in the front-rear direction,
wherein the second-end-side flange extends from an upper end of the second-end wall toward the second side in the front-rear direction,
wherein the brace is disposed below the roof panel, coupled to an end on the second side in the front-rear direction of the rail, and extending in the front-rear direction,
wherein the reinforcing member reinforces a connection portion of the rail, the connection portion being coupled to the brace,
wherein the reinforcing member comprises a main wall, side walls in pairs, and side flanges in pairs,
wherein the main wall extends substantially in the left-right direction in a front cross section,
wherein the side walls extend substantially downward from respective ends in the left-right direction of the main wall,
wherein each of the side flanges extends substantially outward in the left-right direction from a lower end of a corresponding one of the side walls,
wherein the main wall has a first end on the first side in the front-rear direction welded to the first-end-side flange of the rail, and a second end on the second side in the front-rear direction welded to the second-end-side flange of the rail and to an end of the brace on the first side in the front-rear direction,
wherein the flanges of the reinforcing member are welded to the bottom wall of the rail, and
wherein the roof panel is bonded to the main wall of the reinforcing member.
2. The vehicle body structure according to claim 1,
wherein the first-end-side flange of the rail has a protrusion that protrudes toward the second side in the front-rear direction in a plan view, and the protrusion is welded to the main wall of the reinforcing member,
wherein the main wall of the reinforcing member has beads in pairs that extend in the front-rear direction, the beads being separated from each other in the left-right direction,
wherein the protrusion has a joining position that is joined to the main wall of the reinforcing member and is positioned between the beads in the left-right direction,
wherein each of the beads has an end on the first side in the front-rear direction, the end being positioned on the first side in the front-rear direction when viewed from the joining position of the protrusion, and
wherein, below the main wall of the reinforcing member, the bottom wall of the rail has an in-vehicle device attachment portion to which an in-vehicle device is to be attached.
3. The vehicle body structure according to claim 2,
wherein the protrusion of the first-end-side flange of the rail has at least three first side joined portions that are welded to the main wall of the reinforcing member, and
wherein at least one joining position located on a center side in the left-right direction among the first side joined portions is disposed on the second side in the front-rear direction with respect to two joining positions respectively located on outermost sides among the first side joined portions.
4. The vehicle body structure according to claim 2,
wherein the brace comprises, in a front cross section, a main wall, vertical walls in pairs, and a pair of side flanges, the main wall extending substantially in the left-right direction, the walls extending substantially upward from respective ends of the main wall in the left-right direction, each of the flanges extending sub- stantially outward in the left-right direction from an upper end of a corresponding one of the vertical walls, wherein the main wall of the reinforcing member has a recess including vertical wall portions in pairs extending in the front-rear direction and a bottom portion connecting the vertical wall portions, wherein the vertical walls of the brace are continuous with the respective vertical wall portions of the reinforcing member, and wherein each of the vertical wall portions of the reinforcing member has an end on the first side in the front-rear direction that is located on the first side in the front-rear direction with respect to ends on the second side in the front-rear direction of the beads.

5. The vehicle body structure according to claim 3, wherein the brace comprises, in a front cross section, a main wall, vertical walls in pairs, and a pair of side flanges, the main wall extending substantially in the left-right direction, the walls extending substantially upward from respective ends of the main wall in the left-right direction, each of the flanges extending substantially outward in the left-right direction from an upper end of a corresponding one of the vertical walls, wherein the main wall of the reinforcing member has a recess including vertical wall portions in pairs extending in the front-rear direction and a bottom portion connecting the vertical wall portions, wherein the vertical walls of the brace are continuous with the respective vertical wall portions of the reinforcing member, and wherein each of the vertical wall portions of the reinforcing member has an end on the first side in the front-rear direction that is located on the first side in the front-rear direction with respect to ends on the second side in the front-rear direction of the beads.

6. The vehicle body structure according to claim 1, wherein the main wall of the reinforcing member has a first joining position jointed to the first-end side flange of the rail, and a second joining position jointed to the second-end side flange of the rail, and wherein, at a predetermined position in the left-right direction, the first joining position and the second joining position are substantially same in height from the bottom wall of the rail.

7. The vehicle body structure according to claim 2, wherein the main wall of the reinforcing member has a first joining position jointed to the first-end side flange of the rail, and a second joining position jointed to the second-end side flange of the rail, and wherein, at a predetermined position in the left-right direction, the first joining position and the second joining position are substantially same in height from the bottom wall of the rail.

8. The vehicle body structure according to claim 3, wherein the main wall of the reinforcing member has a first joining position jointed to the first-end side flange of the rail, and a second joining position jointed to the second-end side flange of the rail, and wherein, at a predetermined position in the left-right direction, the first joining position and the second joining position are substantially same in height from the bottom wall of the rail.

9. The vehicle body structure according to claim 4, wherein the main wall of the reinforcing member has a first joining position jointed to the first-end side flange of the rail, and a second joining position jointed to the second-end side flange of the rail, and wherein, at a predetermined position in the left-right direction, the first joining position and the second joining position are substantially same in height from the bottom wall of the rail.

10. The vehicle body structure according to claim 5, wherein the main wall of the reinforcing member has a first joining position jointed to the first-end side flange of the rail, and a second joining position jointed to the second-end side flange of the rail, and wherein, at a predetermined position in the left-right direction, the first joining position and the second joining position are substantially same in height from the bottom wall of the rail.

* * * * *